Patented July 18, 1950

2,515,748

UNITED STATES PATENT OFFICE 2,515,748

FRUIT JUICE EXTRACTING MACHINE

David A. Wallace, Grosse Pointe Farms, and Raymond E. Hewlett, Detroit, Mich., assignors to Hewlett Manufacturing Company, Detroit, Mich., a corporation of Michigan Application May 9, 1946, Serial No. 668,566

5 Claims. (Cl. 100—35)

This invention relates to improved apparatus for extracting juices from fruits.

Heretofore devices of complicated structure and operation have been employed to automatically perform this function. It is an object of our invention to provide a simplified mechanism for this purpose. Simplicity is desirable because of relatively low manufacturing cost, cleanliness, and uninterrupted performance.

The art discloses that the operation of extracting juices from fruits comprises the successive steps of transporting, slicing, squeezing and discharging the fruit. Separate cooperating mechanisms are usually provided for each of these operations. We have provided one moving medium which controls each of these operations. In our invention we have provided a single means which is the moving medium for the whole fruit and its component segments remaining after its slicing.

A pair of cooperative endless chains or belts are proposed herein as the moving medium to which we have referred.

Figure 1:
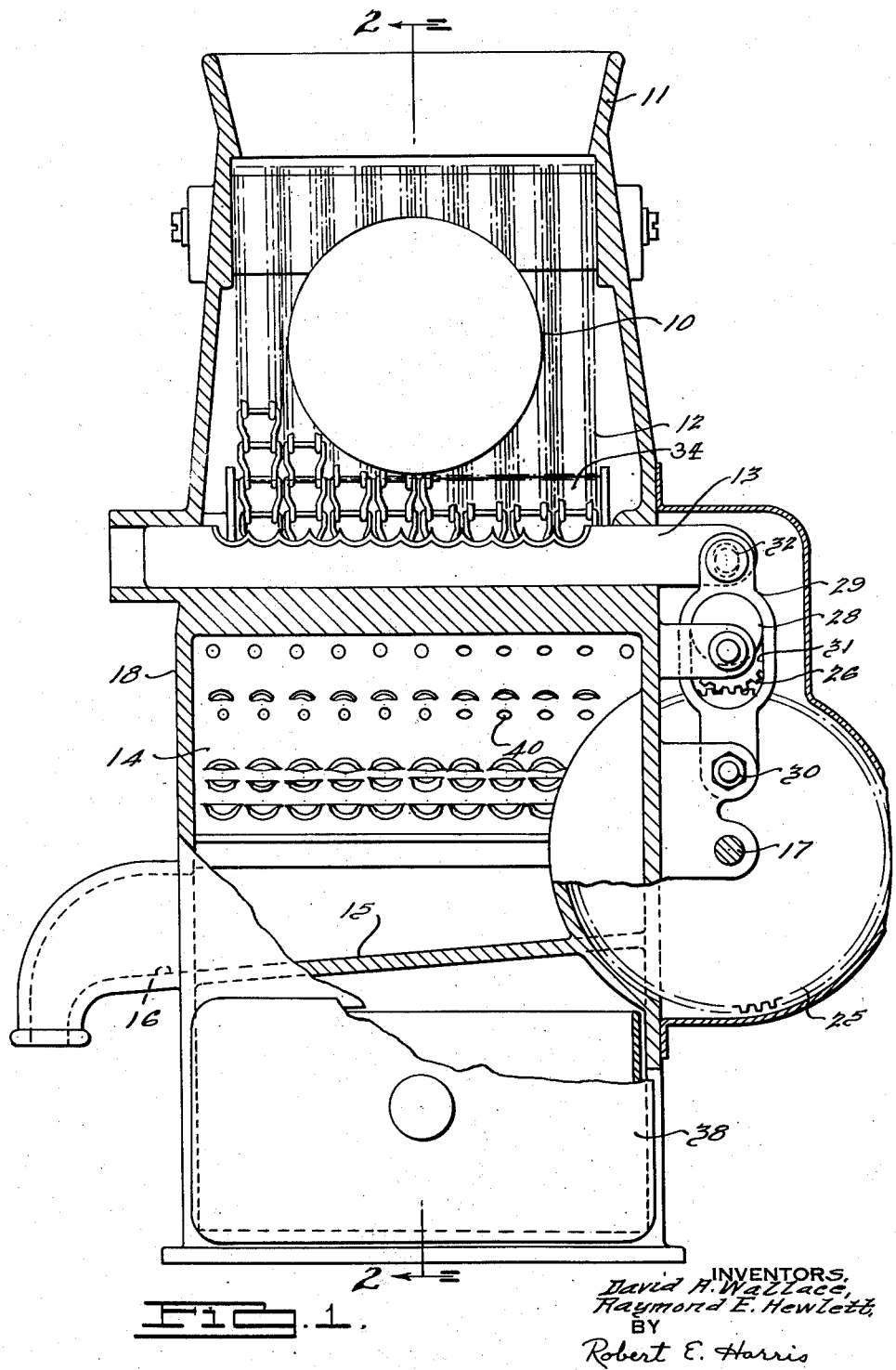
Fig. 1 is a vertical sectional view of our device.
Figure 2:
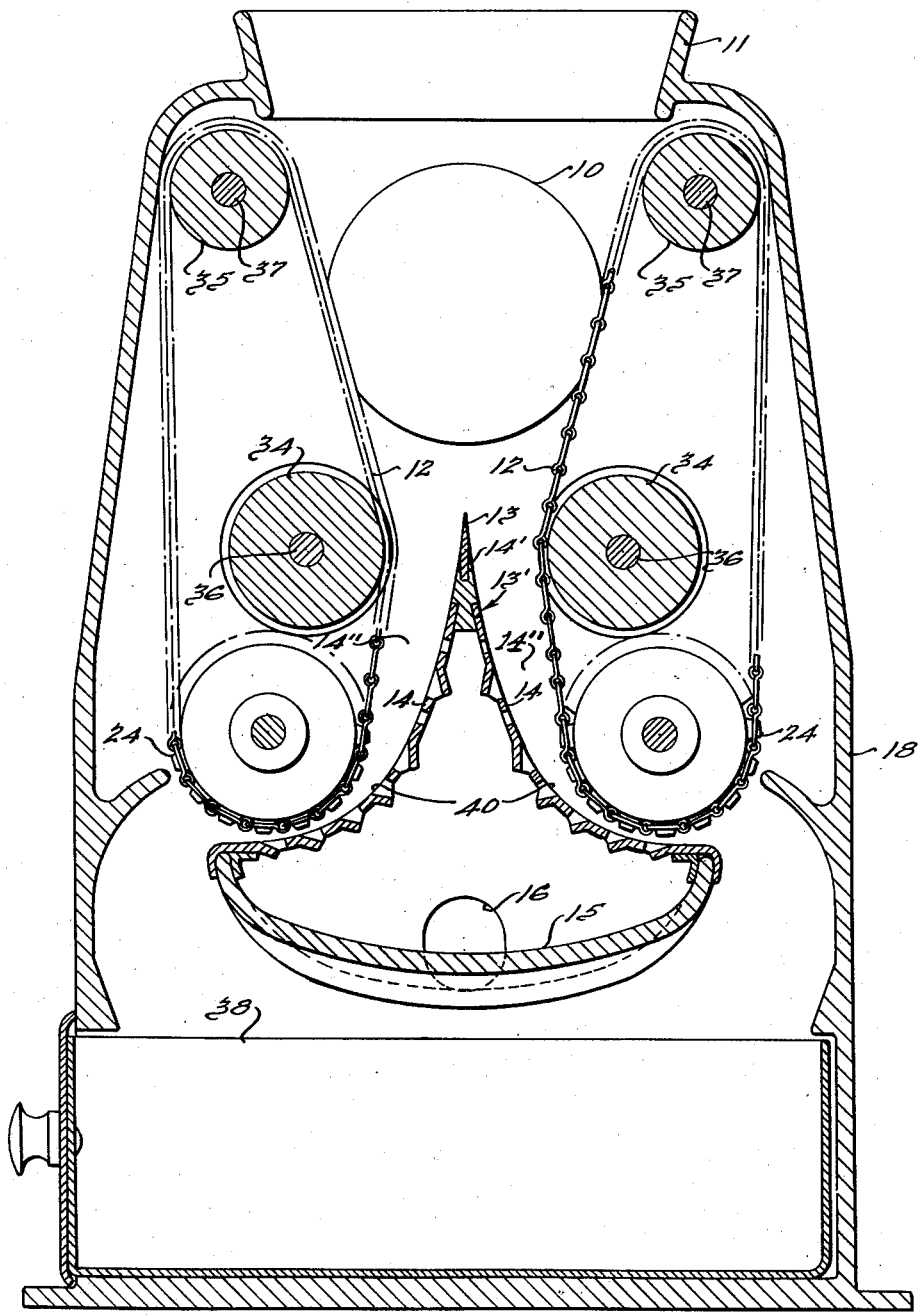
Fig. 2 is a section on the lines 2—2 of Fig. 1.

Referring to the drawings Figures 1 and 2 illustrate a fruit 10, such as an orange, which has entered a hopper 11 provided in the upper portion of a housing 18 and is engaged by a pair of endlessly moving belt elements 12 rotatably mounted in housing 18. The elements 12 are preferably formed from chains but other flexible mediums could be substituted. A knife 13 is slidably mounted in housing 18 for reciprocation therein. The fruit 10 is shown as approaching the knife 13 which is reciprocated by means to be described herein and adapted to slice the fruit into hemispherical segments. A spreader, generally designated by the numeral 13' is located below the knife 13 and comprises a pair of intersecting concave sieve elements 14 which are adapted to separate pulp and other substantially solid matter from extracted juices by permitting juice to drain through openings 40 provided therein. The knife 13 is received in a groove 14' located at the intersection of sieves 14 of the spreader 13' and is slidably mounted therein. The spaced lower edges of the sieves are connected by an inclined trough 15 which is mounted below sieves 14 and which is adapted to discharge juices from an orifice 16 provided in housing 18.

Figure 3:
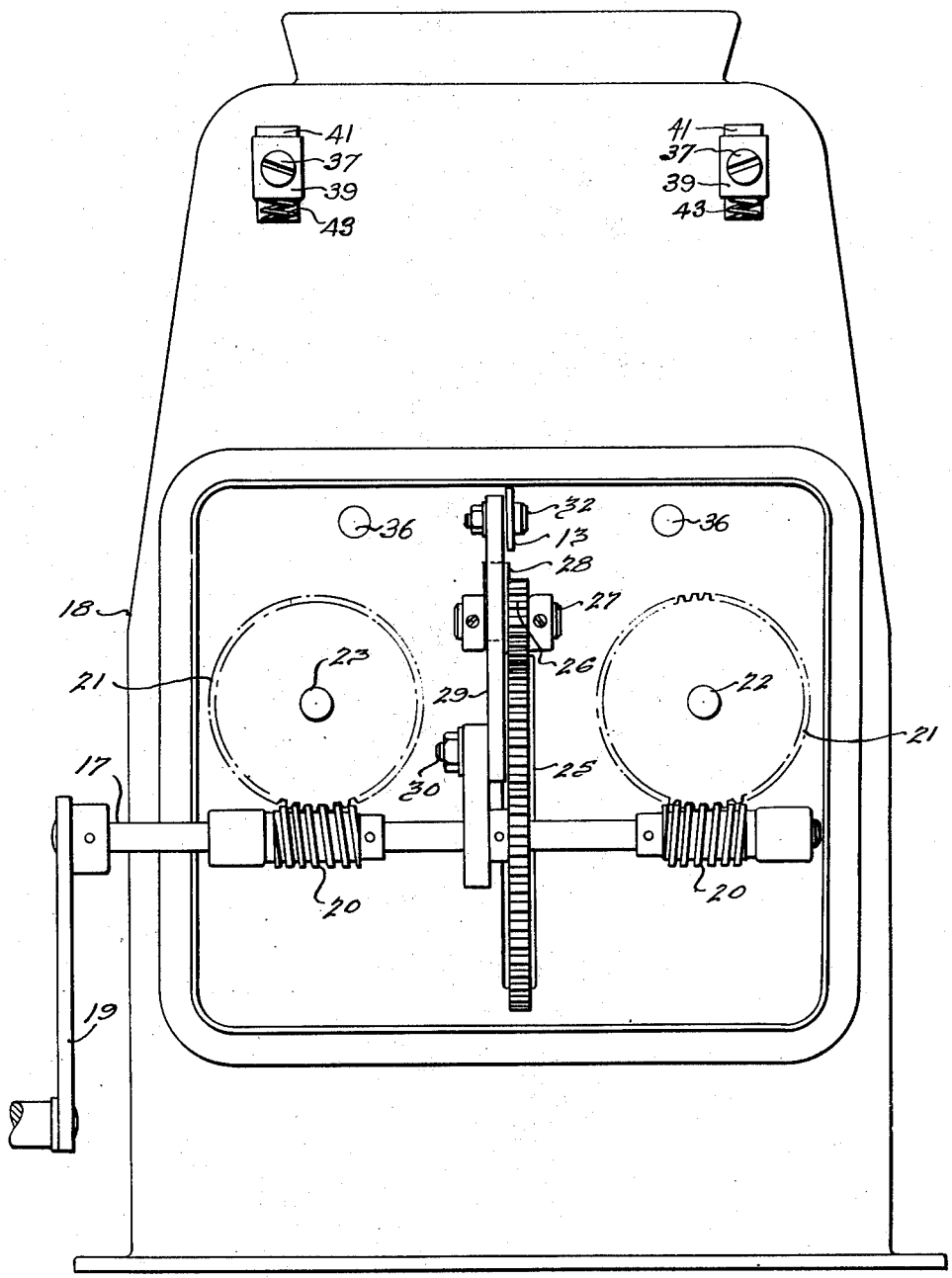
Fig. 3 is an elevational view of the device from the rear with the back cover plate removed and showing the mechanical means for imparting motion to the operating parts of our device.

Referring to Figures 2 and 3 the mechanical means for accomplishing these results will be described in more detail. In Fig. 3 a power shaft 17 is illustrated as rotatably mounted in housing 18. This shaft may be rotated by any suitable means, either motor or manual, although a conventional crank 19 has been illustrated as keyed thereto. A pair of worms 20 having opposite pitch are keyed to shaft 17 and adapted to mesh with a pair of worm wheels 21 each keyed to one of the shafts 22 and 23, respectively. The shafts 22 and 23 are rotatably mounted in housing 18. Rotation of shaft 17 and worms 20 fixed thereto, rotates the worm wheels 21 in opposite directions. A pair of driving sprockets 24 is keyed to each of the shafts 22 and 23, respectively. Rollers 34 and 35 rotatably mounted on shafts 36 and 37 which are supported by the housing 18 guide belt elements 12. Shafts 37 are illustrated as carried by bearing members 39 which are slidably received by slots 41 provided in housing 18 and urged to tension belt elements 12 by springs 43. The belt elements 12 are mounted on the rollers 34 and 35 and the sprockets 24 and are driven by the sprockets. The pair of concave sieve elements 14 referred to above are supported by housing 18 and the lower end portion of each sieve is arcuately curved beneath one of the sprockets 24, respectively. Each sieve 14 which forms one side wall of the separator 13' is so shaped and disposed as to form a chamber 14" of gradually decreasing width between it and the adjacent belt element 12. As a fruit segment is moved through the chamber 14" it is progressively flattened and crushed and the rind is finally forcefully squeezed between the belt and the lower arcuate part of the adjacent sieve as the belt passes around the sprocket 24.

A spur gear 25 is keyed to shaft 17 and engages a gear 26 rotatably mounted on shaft 27 mounted in housing 18. A cam 28 is eccentrically mounted on shaft 27. A lever 29 is rotatably mounted on housing 18 at 30 and provided with a cam slot 31 therein. Cam 28 engages cam slot 31. The knife blade 13 is slidably mounted for reciprocation in housing 18 and sieves 14 and has a slot and pin connection with lever 29 at 32. Blade 13 is disposed for reciprocative movement relative to the sieve and housing in a direction parallel to shafts 22 and 23. It is evident that rotation of shaft 17 rotates the eccentric cam 28 which induces a reciprocation of knife blade 13.

A suitable open top drawer 38 is slidably mounted in housing 18 and adapted to collect rinds, seeds and other waste products for disposal.

In the operation of our device the fruit 10 enters through hopper 11 and is tangentially engaged on opposite sides thereof by sections of belt elements 12. These sections of the belts are moving downwardly in planes inclined toward each other whereby the grip on the fruit is increasing as it is drawn down into the device until it is moved into contact with reciprocating knife blade 13 which severs it. A hemispherical segment of the fruit is drawn still further downward by each belt element 12 and compressed against a sieve element 14 and the juices extracted therefrom. The extracted juices run through the openings 40 in sieve 14 and down trough 15 and out orifice 16. Belt element 12 then carries the remaining substantially solid components of the segment over the end of sieve 14 from which point they drop by gravity into drawer 38.

We claim:

1. A device for extracting juices from fruit having means providing a predetermined path of movement for a fruit, said path having an entrant first portion and a pair of divergent portions which fork from said first portion, and a cutting element located adjacent to the intersection of said divergent portions with said first portion in a plane containing the longitudinal axis of said path of movement at said intersection, said means including a pair of fixed diverging sieve members defining the adjacent inner sides of said divergent path portions and a pair of opposed belt elements defining said first portion of said path and the outer sides of said divergent path portions, said belt elements presenting opposed faces having portions which converge adjacent said first path portion and portions which diverge relative to each other adjacent said divergent portions of said path.

2. A device for extracting juices from fruit having means providing a predetermined path of movement for a fruit, said path having an entrant first portion and a pair of divergent portions which fork from said first portion, and a cutting element located adjacent to the intersection of said divergent portions with said first portion in a plane containing the longitudinal axis of said path of movement at said intersection, said means including a pair of fixed diverging sieve members defining the adjacent inner sides of said divergent path portions, a first set of rollers rotatably mounted on parallel axes on a first side of said path, a second set of rollers rotatably mounted on parallel axis on a second side of said path, the axes of said first and second sets of rollers each being parallel to the plane of said cutting element, a first belt carried by said first set of rollers, and a second belt carried by said second set of rollers, said belts defining the outer sides of said path and being operable to move a fruit through said first portion of said path and a segment thereof through each of said divergent portions of said path.

3. A device for extracting juices from fruit having means providing a predetermined path of movement for a fruit, said path having an entrant first portion and a pair of divergent portions which fork from said first portion, and a cutting element located adjacent to the intersection of said divergent portions with said first portion in a plane containing the longitudinal axis of said path of movement at said intersection, said means including a pair of fixed diverging sieve members defining the adjacent inner sides of said divergent path portions and a pair of opposed belt elements defining said first portion of said path and the outer sides of said divergent path portions, said belt elements presenting opposed faces each having a substantially uniform dimension which is greater than the diameter of fruit from which it is proposed to extract juice.

4. A device for extracting juices from fruit having means providing a predetermined path of movement for a fruit, said path having an entrant first portion and a pair of divergent portions which fork from said first portion, and a cutting element located adjacent to the intersection of said divergent portions with said first portion in a plane containing the longitudinal axis of said path of movement at said intersection, said means including a pair of fixed diverging sieve members defining the adjacent inner sides of said divergent path portions, a first set of rollers rotatably mounted on parallel axes on a first side of said path, a second set of rollers rotatably mounted on parallel axes on a second side of said path, the axes of said first and second sets of rollers each being parallel to the plane of said cutting element, a first belt carried by said first set of rollers, and a second belt carried by said second set of rollers, said belts defining the outer sides of said path and being operable to move a fruit through said first portion of said path and a segment thereof through each of said divergent portions of said path, at least one of the rollers of each of said sets being located adjacent one of said sieve members and a predetermined distance therefrom so that a fruit segment traveling through either of said divergent portions of said path passes through a restricted portion of said path having a fixed width whereby a non-yielding pressure is applied to said segment while the latter is adjacent said sieve member.

5. A device for extracting juices from fruit having means providing a predetermined path of movement for a fruit, said path having an entrant first portion, and a pair of divergent portions which fork from said first portion, and a cutting element located adjacent to the intersection of said divergent portions with said first portion in a plane containing the longitudinal axis of said path of movement at said intersection, said means including a pair of fixed diverging sieve members defining the adjacent inner sides of said divergent path portions and a pair of opposed belt elements defining said first portion of said path and the outer sides of said divergent path portions, said belt elements presenting opposed faces having portions thereof which diverge relative to each other.

DAVID A. WALLACE.
RAYMOND E. HEWLETT.

REFERENCES CITED

The following references are of record in the file of this patent:

UNITED STATES PATENTS

| Number | Name | Date |
|---|---|---|
| 1,159,187 | Day | Nov. 2, 1915 |
| 1,609,523 | McLaughlin | Dec. 7, 1926 |
| 1,620,551 | Hughes | Mar. 8, 1927 |